United States Patent
DeSota et al.

(10) Patent No.: US 7,210,018 B2
(45) Date of Patent: Apr. 24, 2007

(54) MULTIPLE-STAGE PIPELINE FOR TRANSACTION CONVERSION

(75) Inventors: Donald R. DeSota, Portland, OR (US); Bruce M. Gilbert, Beaverton, OR (US); Robert Joersz, Portland, OR (US); Thomas D. Lovett, Portland, OR (US); Maged M. Michael, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 480 days.

(21) Appl. No.: 10/334,855

(22) Filed: Dec. 30, 2002

(65) Prior Publication Data

US 2004/0128462 A1 Jul. 1, 2004

(51) Int. Cl.
  *G06F 12/00* (2006.01)
(52) U.S. Cl. ...................................... 711/169
(58) Field of Classification Search ................ 711/100, 711/103, 141, 140, 169; 717/160; 716/3
  See application file for complete search history.

(56) References Cited

U.S. PATENT DOCUMENTS 5,303,357 A * 4/1994 Inoue et al. ................ 717/160
6,546,465 B1 * 4/2003 Bertone ....................... 711/144
6,654,858 B1 * 11/2003 Asher et al. ................. 711/144
6,732,084 B1 * 5/2004 Kabra et al. ................... 707/2
2004/0158802 A1 * 8/2004 Wong et al. ................... 716/3

OTHER PUBLICATIONS

Berg et al; "Critical Review of Programmable Mediaprocessor Architectures," SPIE Proceedings, vol. 3655, pp. 147-156, 1999.*

* cited by examiner

Primary Examiner—Pierre-Michel Bataille
(74) Attorney, Agent, or Firm—Abdy Raissinia

(57) ABSTRACT

A multiple-stage pipeline for transaction conversion is disclosed. A method is disclosed that converts a transaction into a set of concurrently performable actions. In a first pipeline stage, the transaction is decoded into an internal protocol evaluation (PE) command, such as by utilizing a look-up table (LUT). In a second pipeline stage, an entry within a PE random access memory (RAM) is selected, based on the internal PE command. This may be accomplished by converting the internal PE command into a PE RAM base address and an associated qualifier thereof. In a third pipeline stage, the entry within the PE RAM is converted to the set of concurrently performable actions, such as based on the PE RAM base address and its associate qualifier.

19 Claims, 5 Drawing Sheets

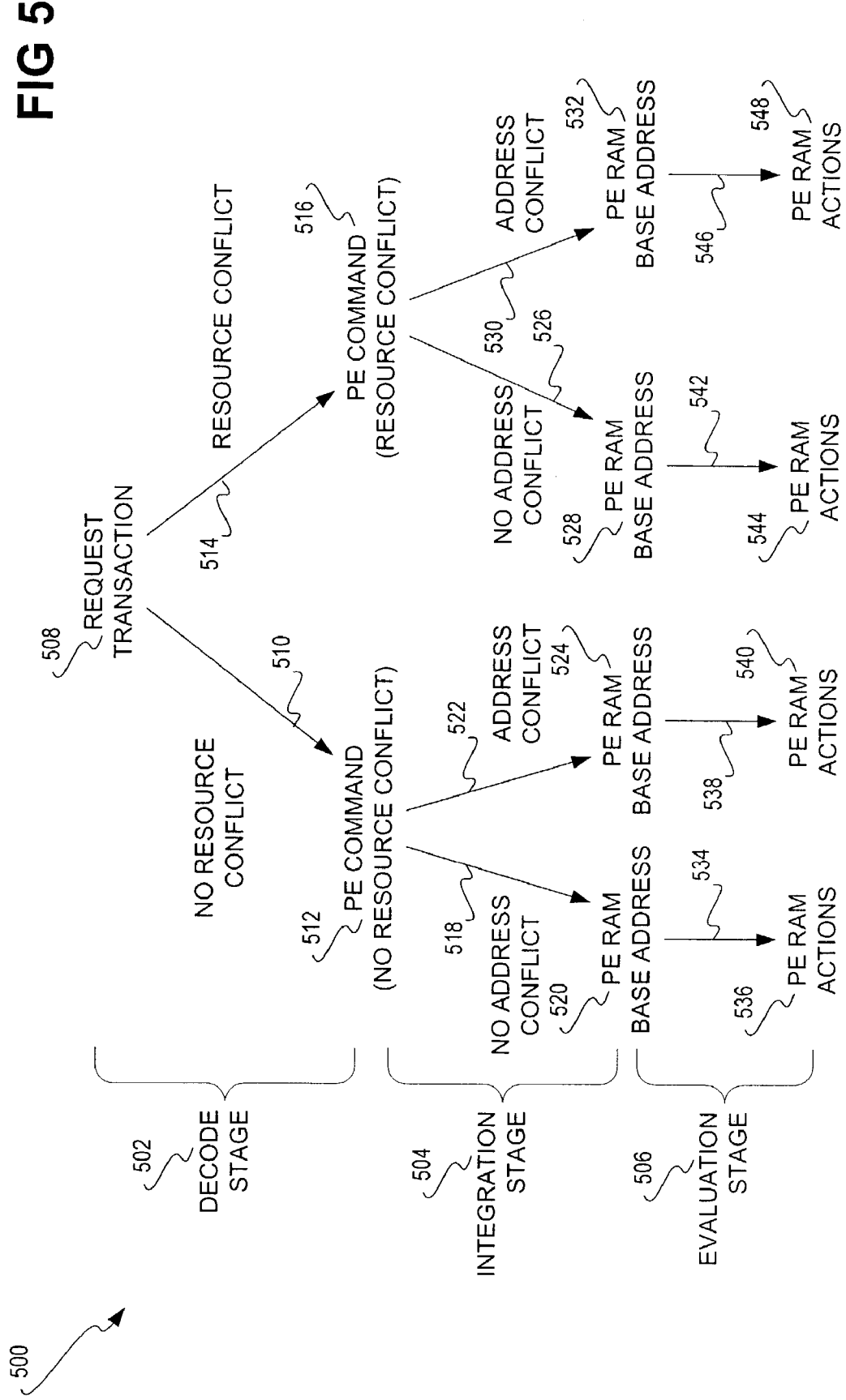

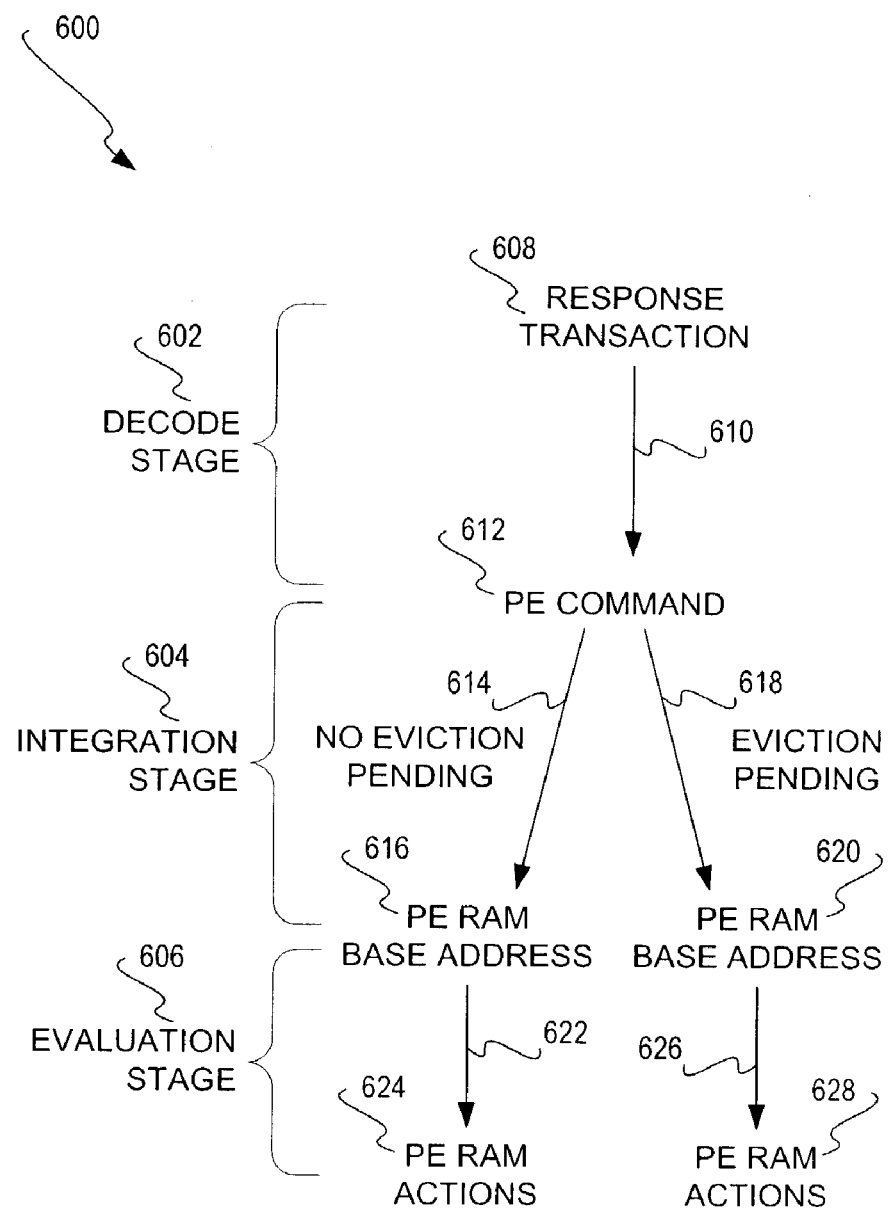

MULTIPLE-STAGE PIPELINE FOR TRANSACTION CONVERSION

BACKGROUND OF THE INVENTION

1. Technical Field

This invention relates generally to transactions, such as memory requests and their responses, and more particularly to the conversion of such transactions into performable actions.

2. Description of the Prior Art

There are many different types of multi-processor computer systems. A symmetric multi-processor (SMP) system includes a number of processors that share a common memory. SMP systems provide scalability. As needs dictate, additional processors can be added. SMP systems usually range from two to 32 or more processors. One processor generally boots the system and loads the SMP operating system, which brings the other processors online. Without partitioning, there is only one instance of the operating system and one instance of the application in memory. The operating system uses the processors as a pool of processing resources, all executing simultaneously, where each processor either processes data or is in an idle loop waiting to perform a task. SMP systems increase in speed whenever processes can be overlapped.

A massively parallel processor (MPP) system can use thousands or more processors. MPP systems use a different programming paradigm than the more common SMP systems. In an MPP system, each processor contains its own memory and copy of the operating system and application. Each subsystem communicates with the others through a high-speed interconnect. To use an MPP system effectively, an information-processing problem should be breakable into pieces that can be solved simultaneously. For example, in scientific environments, certain simulations and mathematical problems can be split apart and each part processed at the same time.

A non-uniform memory access (NUMA) system is a multi-processing system in which memory is separated into distinct banks. NUMA systems are similar to SMP systems. In SMP systems, however, all processors access a common memory at the same speed. By comparison, in a NUMA system, memory on the same processor board, or in the same building block, as the processor is accessed faster than memory on other processor boards, or in other building blocks. That is, local memory is accessed faster than distant shared memory. NUMA systems generally scale better to higher numbers of processors than SMP systems.

Multi-processor systems usually include one or more memory controllers to manage memory transactions from the various processors. The memory controllers negotiate multiple read and write requests emanating from the processors, and also negotiate the responses back to these processors. Usually, a memory controller includes a pipeline, in which transactions, such as requests and responses, are input, and actions that can be performed relative to the memory for which the controller is response are output. Transaction conversion is commonly performed in a single stage of a pipeline, such that transaction conversion to performable actions is performed in one step.

However, performing transaction conversion in a single stage of a pipeline suffers from some deficiencies. They may be inefficient, since the memory controller must convert a given transaction to performable actions before it acts on the next transaction. This can make the pipeline a bottleneck within the performance of the memory controller, decreasing overall performance of the memory controller, and hence the multi-processor system of which it is a part. Single-stage conversion may also be difficult to implement, due to the complexity involved in converting a transaction into performable actions. For these described reasons, as well as other reasons, there is a need for the present invention.

SUMMARY OF THE INVENTION

The invention relates to a multiple-stage pipeline for transaction conversion. In a method of the invention, a transaction is converted into a set of concurrently performable actions. In a first pipeline stage, the transaction is decoded into an internal protocol evaluation (PE) command. In a second pipeline stage, an entry within a PE random access memory (RAM) is selected, based on the internal PE command. In a third pipeline stage, the entry within the PE RAM is converted to the set of concurrently performable actions.

A system of the invention includes a plurality of processors, local RAM for the plurality of processors, and at least one memory controller. The memory controller(s) manage transactions relative to the local RAM. Each controller has a multiple-stage pipeline for managing the transactions. The pipeline includes a decode stage, an integration stage, and an evaluation stage to convert the transactions to sets of concurrently performable actions.

An article of manufacture of the invention includes a computer-readable medium and means in the medium. The means is for converting a transaction into a set of concurrently performable actions, utilizing a multiple-stage pipeline that includes a decode stage, an integration stage, and an evaluation stage. Other features, aspects, embodiments and advantages of the invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 5 is a diagram of an example flow of a request transaction through the pipeline of FIG. 4, according to an embodiment of the invention.

FIG. 6 is a diagram of an example flow of a response transaction through the pipeline of FIG. 4, according to an embodiment of the invention.

DESCRIPTION OF THE PREFERRED EMBODIMENT

Overview

Figure 1:
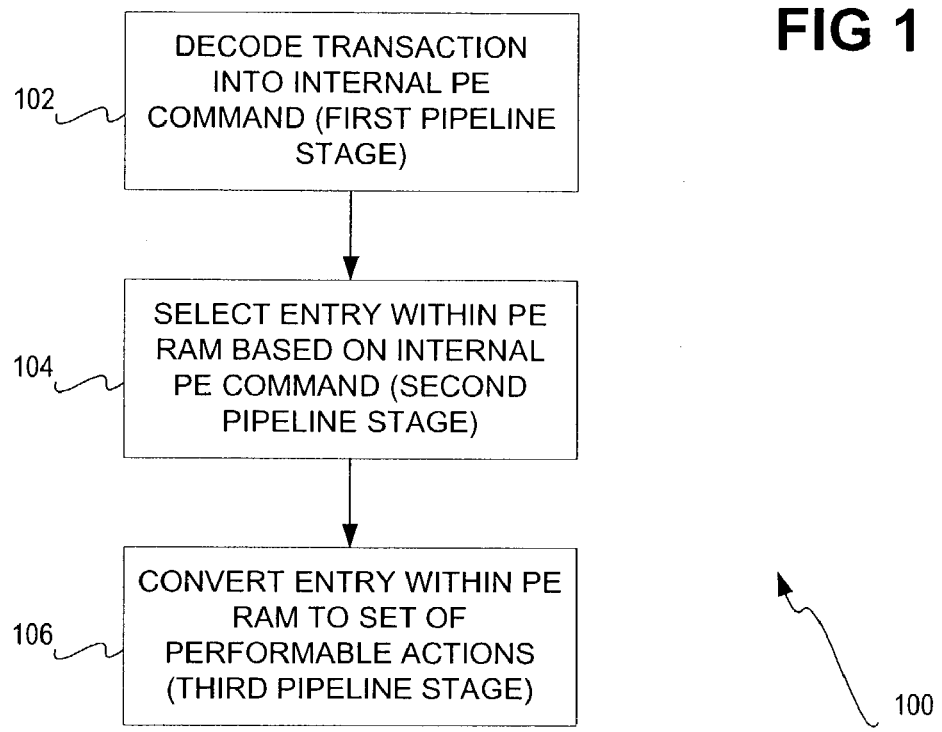
FIG. 1 is a flowchart of a method according to a preferred embodiment of the invention, and is suggested for printing on the first page of the patent.

FIG. 1 shows a method 100 according to a preferred embodiment of the invention. The method 100 can be implemented as an article of manufacture having a computer-readable medium and means in the medium for performing the functionality of the method 100. The medium may be a recordable data storage medium, a modulated carrier signal, or another type of medium. The method 100 converts a transaction into a set of concurrently performable actions using a multiple-stage pipeline, specifically a three-stage pipeline. The method 100 preferably is operable within a multiple-processor system in which the transactions relate to memory requests and memory responses from and to the processors, to properly manage the memory vis-à-vis the processors. Prior to performance of the method 100, arbitration of the transaction among other transactions may be accomplished to determine the order in which they enter the pipeline.

In a first, decode, pipeline stage, a transaction is decoded into an internal protocol evaluation (PE) command (102). The internal PE command is used by the method 100 to assist in determining the set of performable actions that may be concurrently performed to effect the transaction. In one embodiment, a look-up table (LUT) is used to retrieve the internal PE command, based on the transaction proffered. There may be more than one LUT, one for each different type of transaction. For instance, the method 100 may utilize a coherent request decode random-access memory (RAM) as the LUT for coherent memory requests, a non-coherent request decode RAM as the LUT for non-coherent memory requests, and a response decode RAM as the LUT for memory responses.

In a second, integration, pipeline stage, an entry within a PE RAM is selected based on the internal PE command (104). The PE RAM is the memory in which the performable actions are specifically stored or otherwise indicated. The entry within the PE RAM thus indicates the performable actions to be performed for the transaction, as converted to the internal PE command. In one embodiment, the PE command is first converted into a base address within the PE RAM, and an associated qualifier having a qualified state, which are then used to select the appropriate PE RAM entry. Furthermore, the transaction may be arbitrated among other transactions within the second pipeline stage. That is, the transactions may be re-arbitrated within the second stage, such that the order in which the transactions had entered the pipeline may be changed.

In a third, evaluation, pipeline stage, the entry within the PE RAM is converted to a set of concurrently performable actions to effect the transaction (106). In one embodiment, this is accomplished by selecting the set of concurrently performable actions, based on the entry within the PE RAM, where the PE RAM stores or otherwise indicates the actions to be performed. Once the performable actions have been determined, the conversion of the transaction to the performable actions is complete. The actions may then be preferably concurrently performed to effect the transaction relative to the memory of the multiple-processor system.

Technical Background

Figure 2:
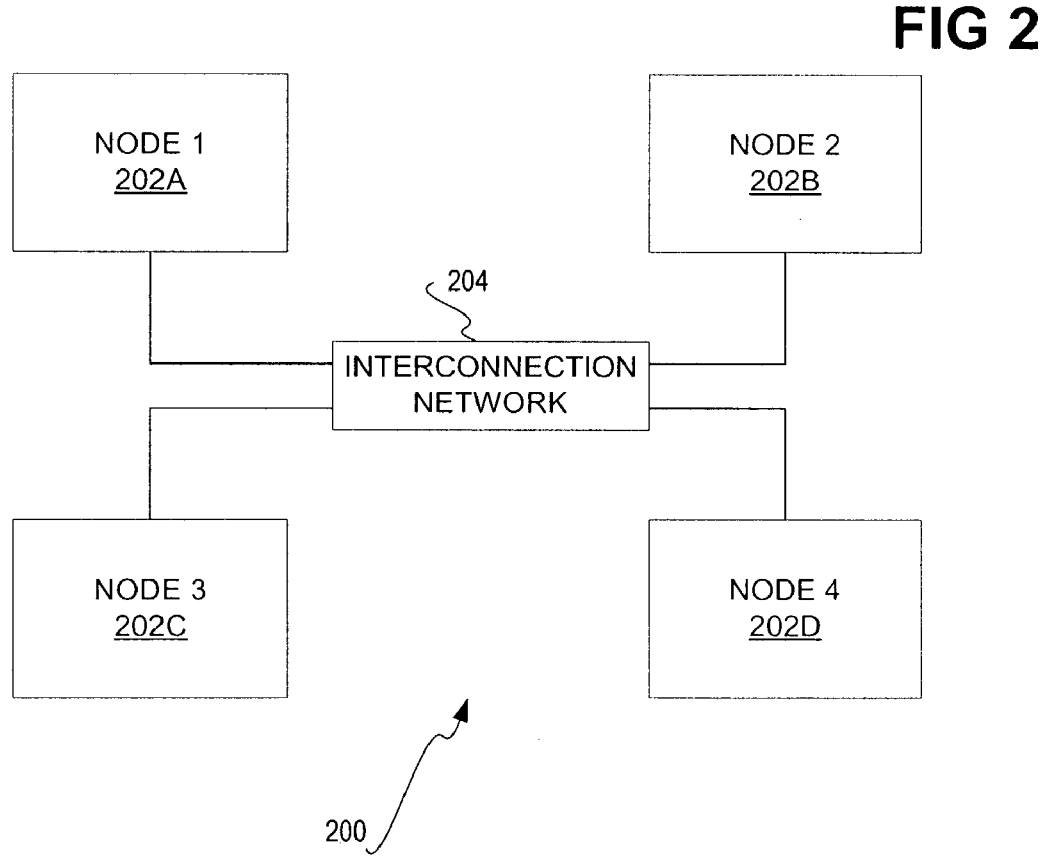
FIG. 2 is a diagram of a system having a number of multi-processor nodes, in conjunction with which embodiments of the invention may be implemented.

FIG. 2 shows a system 200 in accordance with which embodiments of the invention may be implemented. The system 200 includes a number of multiple-processor nodes 202A, 202B, 202C, and 202D, which are collectively referred to as the nodes 202. The nodes 202 are connected with one another through an interconnection network 204. Each of the nodes 202 may include a number of processors and memory. The memory of a given node is local to the processors of the node, and is remote to the processors of the other nodes. Thus, the system 200 can implement a non-uniform memory architecture (NUMA) in one embodiment of the invention.

Figure 3:
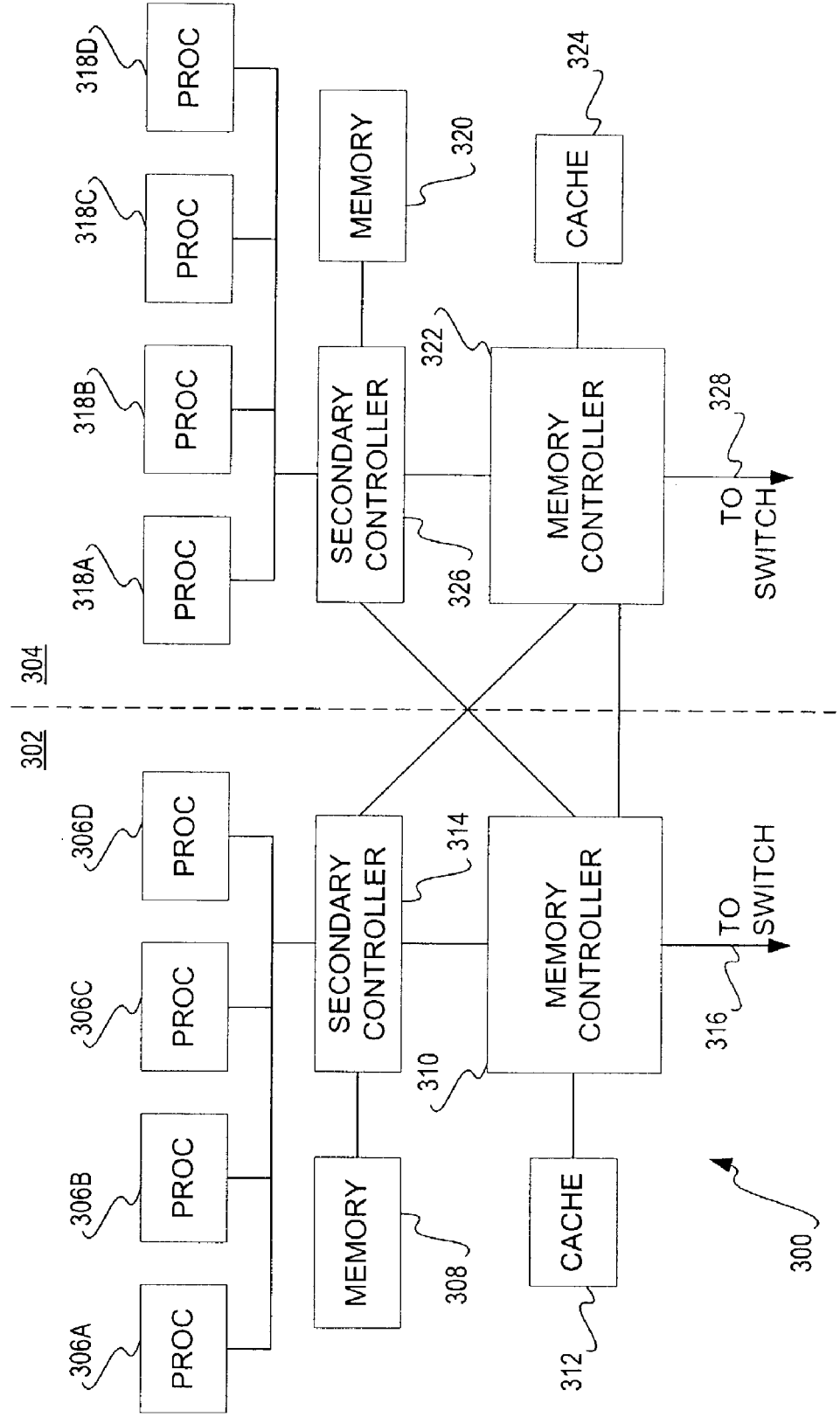
FIG. 3 is a diagram of one of the nodes of the system of FIG. 2 in more detail, according to an embodiment of the invention.

FIG. 3 shows in more detail a node 300, according to an embodiment of the invention, that can implement one or more of the nodes 202 of FIG. 2. As can be appreciated by those of ordinary skill within the art, only those components needed to implement one embodiment of the invention are shown in FIG. 3, and the node 300 may include other components as well. The node 300 is divided into a left part 302 and a right part 304. The left part 302 has four processors 306A, 306B, 306C, and 306D, collectively referred to as the processors 306, whereas the right part 304 has four processors 318A, 318B, 318C, and 318D, collectively referred to as the processors 318. Each of the parts 302 and 304 can operate as a distinct node, or quad, since each has four processors, or the parts 302 and 304 can operate together as a single node.

The left part 302 has a left memory bank 308, whereas the right part 304 has a right memory bank 320. The memory banks 308 and 320 represent a contiguous amount of random-access memory (RAM) local to the node 300 that is divided into the two banks 308 and 320. They may be divided in a number of different ways. For instance, the left bank 308 may have odd memory lines associated with it, whereas the right memory bank 320 may have the even memory lines associated with it. As another example, the left bank 308 may have the first half of the memory lines, whereas the right memory bank 320 may have the second half of the memory lines.

The left memory controller 310 manages requests to and responses from the memory bank 308, whereas the right memory controller 322 manages requests to and responses from the memory bank 320. Each of the controllers 310 and 322 may be an applications-specific integrated circuit (ASIC) in one embodiment, as well as another combination of software and hardware. To assist management of the banks 308 and 320, the controllers have caches 312 and 324, respectively. A left secondary controller 314 specifically interfaces the memory 308, the processors 306, and the memory controller 310 with one another, and a right secondary controller 326 specifically interfaces the memory 320, the processors 318, and the memory controller 322 with one another.

The left memory controller 310 is able to communicate directly with the right memory controller 322, as well as the secondary controller 326. Similarly, the right memory controller 322 is able to communicate directly with the left memory controller 310 as well as the secondary controller 314. Each of the memory controllers 310 and 322 is preferably directly connected to the interconnection network that connects all the nodes, such as the interconnection network 204 of FIG. 2. This is indicated by the line 316, with respect to the memory controller 310, and by the line 328, with respect to the memory controller 322.

Multiple-Stage Pipeline for Memory Controller

Figure 4:
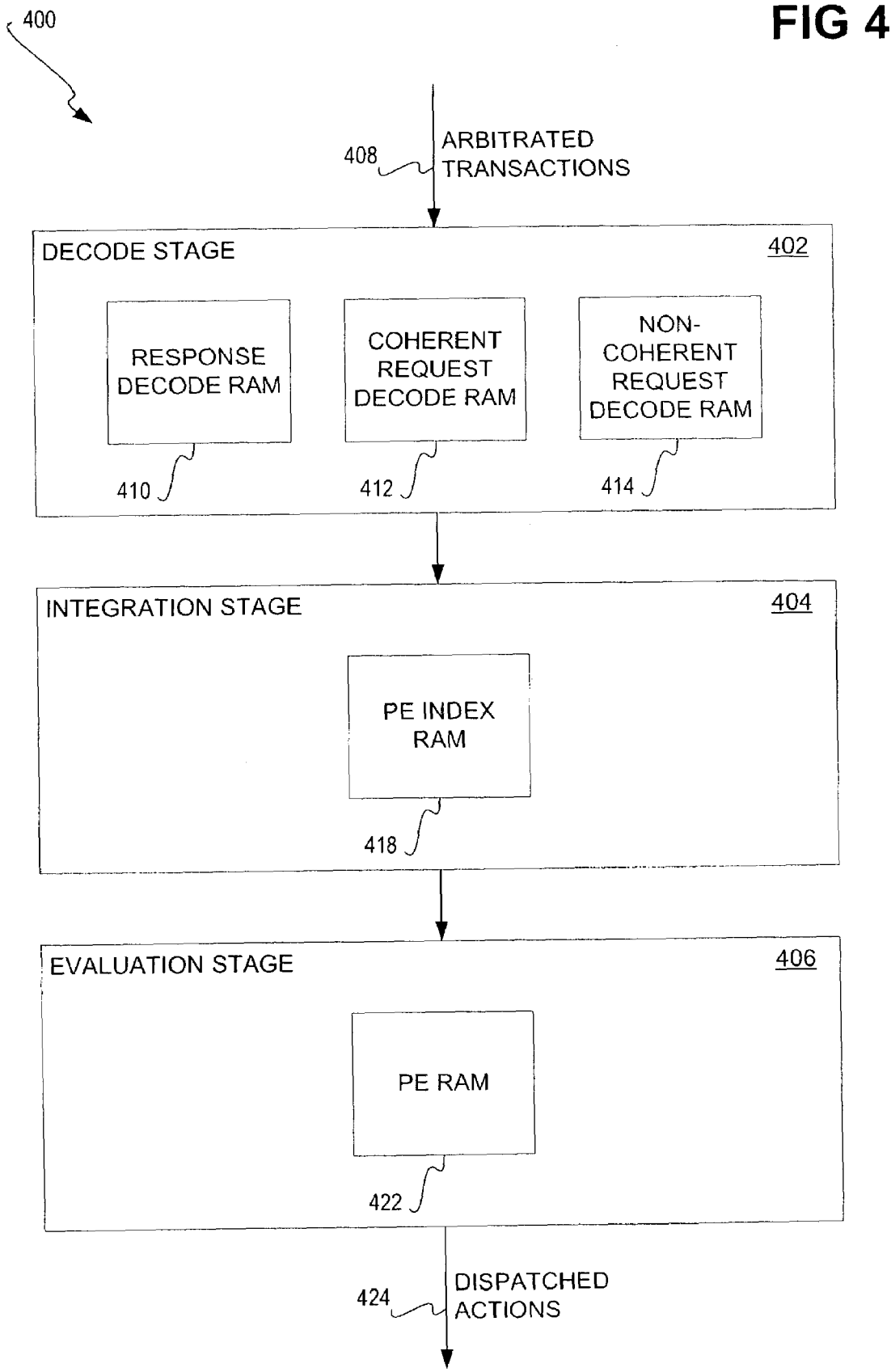
FIG. 4 is a diagram of a multiple-stage pipeline that can be implemented within each of the memory controllers of the node of FIG. 3, to negotiate memory transactions, according to an embodiment of the invention.

FIG. 4 shows a multiple-stage pipeline 400 that is implemented in each of the memory controllers 310 and 322 of FIG. 3, according to an embodiment of the invention. The multiple-stage pipeline 400 includes a decode stage 402, an integration stage 404, and an evaluation stage 406. As can be appreciated by those of ordinary skill within the art, the pipeline 400 may also have additional stages other than stages 402, 404, and 406 depicted in FIG. 4.

Transactions that have been arbitrated in a given order enter the decode stage 402, as indicated by the incoming arrow 408. The decode stage 402 specifically includes a response decode random-access memory (RAM) 410, a coherent request decode RAM 412, and a non-coherent request decode RAM 414. The RAMs 410, 412, and 414 serve as look-up tables (LUTs) for the decode stage 402 to decode transactions into internal protocol evaluation (PE) commands. That is, each of the RAMs 410, 412, and 414 stores PE commands by transaction. For a given transaction, the decode stage 402 looks to the appropriate LUT of the RAMs 410, 412, and 414 to determine the associated PE command. For responses to requests, the response decode RAM 410 is used. For coherent memory requests, the coherent request decode RAM 412 is used, whereas for non-coherent memory requests, the non-coherent request decode RAM 414 is used.

The PE command is then input into the integration stage 404, as indicated by the incoming arrow 416. The integration stage 404 specifically includes a PE index RAM 418. The PE index RAM 418 is organized by PE command, and stores base addresses into the PE RAM 422 of the evaluation stage 406, which actually stores the actions to be concurrently performed to effect a transaction. The PE index RAM 418 also stores qualifiers for the base addresses, which are offsets off the base address to specify a particular number of the actions stored in the PE RAM 422.

The integration stage 404 may initially re-arbitrate the order of the transactions, as they have been converted to PE commands by the decode stage 404, as compared to the initially arbitrated order of the transactions when incoming into the decode stage 402. For a given PE command, the PE index RAM 418 is looked up to determine the PE RAM base address associated with the command. A number of different PE commands may have the same PE RAM base address associated therewith. Therefore, the PE index RAM 418 is also looked up to determine an associated qualifier, which is different for every PE command, and which based on the state of the target memory particularly specifies an offset to the base address.

The PE RAM base address and its qualified state are input into the evaluation stage 406, as indicated by the incoming arrow 420. As has been indicated, the evaluation stage 406 specifically includes the PE RAM 422. The PE RAM 422 stores the actions that are to be selected to effect a given transaction, such as a memory request response or a memory request. Thus, the PE RAM base address and its qualifier reference a number of actions stored in the PE RAM 422. The evaluation stage 406 selects these actions based on the PE RAM base address, using the qualifier as an offset. The resulting selected actions can then be dispatched, as indicated by the outgoing arrow 424, for concurrent performance thereof to effect the transaction that had initially been input into the decode stage 402.

Particular and Alternative Embodiments

In this section of the detailed description, a particular embodiment of the invention is described in detail, with particular reference back to FIG. 4. As can be appreciated by those of ordinary skill within the art, however, the particular embodiment described herein does not represent a limitation on other embodiments of the invention. Furthermore, where appropriate, alternative embodiments to this particular embodiment are described. Therefore, referring to FIG. 4, as has been indicated, the multiple-stage pipeline 400 includes the decode stage 402, the integration stage 404, and the evaluation stage 406.

The decode stage 402 of the pipeline 400 is responsible for converting an incoming request or response into an internal protocol evaluation (PE) command. Three microcode random-access memories (RAMs) are used to determine the PE command based on the request or response type, source agent of the request or response, and the memory region to which the request or response relates. These microcode RAMs are the response decode RAM 410, the coherent request decode RAM 412, and the non-coherent request decode RAM 414. Preferably, these RAMs are look-up tables (LUTs), by which a request or a response is mapped to a given PE command.

Alternatively, the PE command is determined within the decode stage 402 in another manner. For instance, a set of logical rules may be utilized to determine the PE command based on the specific request, response, or other transaction received. The decode stage 402 may send the received transaction to another processing mechanism to determine the PE command. The PE command may additionally be determined by a single LUT, instead of the three RAMs 410, 412, and 414 that function as LUTs for particular types of transactions in FIG. 4. As a final example, the PE command may be determined not necessarily based on the type of PE command, but rather only the memory location to which it relates, and/or other attributes thereof. The PE command is most generally an internal command utilized within the pipeline 400 to assist conversion of a received transaction into a set of concurrently performable actions.

The integration stage 404 of the pipeline 400 utilizes a second microcode structure, the PE index RAM 418, to select the appropriate state information for either a request or a response. This evaluated state information is then combined with a microcoded base address within the PE RAM 422 to select a single evaluation action in the PE RAM 422 in the evaluation stage 406. Thus, the actual entry within the PE RAM 422 to use for a particular PE command is selected by the integration stage 404. Preferably, the PE RAM 422 has an entry for each PE command, with a number of qualifiers for each entry. The qualifiers may be based on whether a cache line eviction is pending, if a cache line is in an unstable transient state, whether or not an address conflict is present in the PE command, and so on. The PE index RAM 418 thus maps a given PE command to an entry within the PE RAM 422 and an associated qualifier.

Alternatively, the base address, or entry, within the PE RAM 422 and its associated qualifier is selected in a different manner within the integration stage 404. Rather than using a RAM like the PE index RAM 418, the integration stage 404 may use a set of logic rules to determine the PE RAM base address and qualifier, or may send the PE command to a different processing mechanism to retrieve the PE RAM base address and qualifier. Furthermore, the PE RAM 422 may be logically organized differently than having a base address, or entry, for each PE command and an associated qualifier depending on various attributes thereof. Rather, the PE RAM 422 may be organized such that there is an entry therein for each different PE command, including its various attributes, such as address conflicts, pending cache line evictions, and so on, in which case no qualifier is needed. The integration stage 404 thus generally begins translation of the PE command decoded in the decode stage 402 to a set of concurrently performable actions.

The evaluation stage 406 provides final evaluation of the request and responses within the pipeline 400. Data from the PE RAM 422 is appropriately latched and broadcast, such that actions are dispatched, as represented by the arrow 424, to effectuate the transactions entering the pipeline, as represented by the arrow 408. Each entry in the PE RAM 422 is used to cause a specific set of actions. That is, the entry within the PE RAM 422 determined in 404, and its associated qualifier, are evaluated within the evaluation stage 406 to determine which actions should be dispatched to effectuate a given transaction. Thus, the evaluation stage 406 preferably utilizes the PE RAM 422 to determine the actions that should be dispatched to effectuate a transaction, based on the entry within the PE RAM 422 and its qualifier determined in the integration stage 404.

Alternatively, the evaluation stage 406 may determine the actions that are to be dispatched to effect a given transaction in a manner other than by using a RAM like the PE RAM 422. The base entry and qualifier provided by the integration stage 404 may represent a general type of action and a qualifier of the general type of action, which the evaluation stage 406 utilizes to generate a specific set of concurrently performable actions to effect a transaction. For example, the evaluation stage 406 may utilize a set of logic rules to yield the set of actions, or may send the base entry and the qualifier to a different processing mechanism to obtain the set of actions. The evaluation stage 406 also may utilize additional or other RAMs beside the PE RAM 422. For instance, there may be a RAM for each base entry and its associated qualifiers, where the base entry corresponds to a particular RAM, and not a particular address within the RAM. The evaluation stage thus generally completes translation of the PE command decoded in the decode stage 402, and the translation of which was begun in the integration stage 404, to a set of concurrently performable actions.

Example Flows Through Pipeline

FIG. 5 shows an example flow 500 through the pipeline 400 of FIG. 4, according to an embodiment of the invention. As can be appreciated by those of ordinary skill within the art, the example flow 500 is described for exemplary purposes only, and does not itself represent a limitation on the invention. A request transaction 508 is input into the decode stage 502 of the example flow 500. The request transaction 508 may either be a transaction that represents a no-resource conflict situation 510, or a resource conflict situation 514. In the former case, the request transaction 508 is decoded into a no-resource conflict protocol evaluation (PE) command 512, whereas in the latter case, the request transaction 508 is decoded into a resource conflict PE command 516.

The PE command 512 or 516 is input into the integration stage 504. For either the command 512 or 516, the command can represent a no-address conflict situation or an address conflict situation. More specifically, the command 512 can represent a no-address conflict situation 518, such that the command 512 is integrated into the PE random-access memory (RAM) base address 520, or an address-conflict situation 522, such that the command 512 is integrated into the PE RAM base address 524. Also more specifically, the command 516 can represent a no-address conflict situation 526, such that the command 516 is integrated into the PE RAM base address 528, or an address conflict situation 530, such that the command 516 is integrated into the PE RAM base address 532. An associated qualifier is also integrated from the PE command 512 or 516.

The PE RAM base address 520, 524, 528, or 532 is input into the evaluation stage 506. The PE RAM base address 520, and its associated qualifier, is evaluated to yield the PE RAM actions 536, as indicated by the arrow 534. The PE RAM base address 524, and its associated qualifier, is evaluated to yield the PE RAM actions 540, as indicated by the arrow 538. The PE RAM base address 528, and its associated qualifier, is evaluated to yield the PE RAM actions 544, as indicated by the arrow 542. Finally, the PE RAM base address 532, and its associated qualifier, is evaluated to yield the PE RAM actions 548, as indicated by the arrow 546. The PE RAM actions 536, 540, 544, or 548 that have been evaluated are then concurrently performed to effect the request transaction 508.

FIG. 6 shows another example flow 600 through the pipeline 400 of FIG. 4, according to an embodiment of the invention. Like the example flow 500 of FIG. 5, the example flow 600 is described for exemplary purposes only, and does not itself represent a limitation on the invention. A response transaction 608 is input into the decode stage 602 of the example flow 600. There are no resource or other conflicts associated with the response transaction 608, so the transaction 608 is decoded into a PE command 612.

The PE command 612 is input into the integration stage 604. Where the response transaction 608 relates to a no-eviction pending situation, the PE command 612 is integrated into the PE RAM base address 616, as indicated by the arrow 614. Where the response transaction 608 relates to an eviction pending situation, the PE command 612 is integrated into the PE RAM base address 620, as indicated by the arrow 618. An associated qualifier is also integrated from the PE command 612.

The PE RAM base address 616 or 620 is input into the evaluation stage 606. The PE RAM base address 616, and its associated qualifier, is evaluated to yield the PE RAM actions 624, as indicated by the arrow 622. The PE RAM base address 620, and its associated qualifier, is evaluated to yield the PE RAM actions 628, as indicated by the arrow 626. The PE RAM actions 624 or 628 that have been evaluated are then concurrently performed to effect the response transaction 608.

Advantages Over the Prior Art

Embodiments of the invention allow for advantages over the prior art. The multiple-stage pipeline of the invention allows for more efficient conversion of transactions into concurrently performable actions. For example, after a transaction has been decoded in the first stage, and has been transferred to the second stage for integration, another transaction can be decoded in the first stage. Similarly, after a transaction has been integrated in the second stage, and has been transferred to the third stage for evaluation, another transaction can be integrated in the second stage. That is, more transactions can be partially processed within the multiple-stage pipeline of the invention, as compared to single-stage pipelines. This lessens the possibility that the pipeline will be a performance bottleneck within the system in which it is implemented.

Furthermore, the utilization of a qualifier for a base address within the protocol evaluation (PE) random access memory (RAM) enables a reduction in size of the PE RAM as compared to not using a qualifier. Having multiple stages in which transactions are converted into performable actions similarly reduces the size of the PE RAM. If only one stage is used to convert transactions, and without the use of a qualifier, as in the prior art, the size of the PE RAM, resulting in a conversion process that is undesirably more complex and slower. A smaller sized PE RAM, as in the invention, allows for a faster, and simpler, conversion process.

Alternative Embodiments

It will be appreciated that, although specific embodiments of the invention have been described herein for purposes of illustration, various modifications may be made without departing from the spirit and scope of the invention. For instance, the system that has been described as amenable to implementations of embodiments of the invention has been indicated as having a non-uniform memory access (NUMA) architecture. However, the invention is amenable to implementation in conjunction with systems having other architectures as well. As another example, the system that has been described has two memory controllers. However, more or less memory controllers may also be used to implement a system in accordance with the invention. Accordingly, the scope of protection of this invention is limited only by the following claims and their equivalents.

I claim:

1. A method for converting a transaction into a set of concurrently performable actions comprising:
   in a first pipeline stage, decoding the transaction into an internal protocol evaluation (PE) command, the transaction being one of a coherent memory request, a non-coherent memory request, and a response to a memory request;
   in a second pipeline stage, selecting an entry within a PE random access memory (RAM) based on the internal PE command; and,
   in a third pipeline stage, converting the entry within the PE RAM to the set of concurrently performable actions.

2. The method of claim 1, wherein decoding the transaction into the internal PE command comprises utilizing a look-up table (LUT) based on the transaction.

3. The method of claim 2, wherein utilizing the LUT based on the transaction comprises:
   where the transaction is the coherent request, utilizing a coherent request decode RAM;
   where the transaction is the non-coherent request, utilizing a non-coherent request decode RAM; and,
   where the transaction is the response, utilizing a response decode RAM.

4. The method of claim 1, wherein selecting the entry within the PE RAM comprises converting the internal PE command into a PE RAM base address and an associated qualifier of the PE RAM base address.

5. The method of claim 4, wherein selecting the entry within the PE RAM further comprises arbitrating the transaction among other transactions based on the PE RAM base address and the associated qualifier of the PE RAM base address.

6. The method of claim 4, wherein selecting the entry within the PE RAM further comprises selecting the entry within the PE RAM based on the PE RAM base address and a qualified state of the associated qualifier.

7. The method of claim 1, wherein converting the entry within the PE RAM to the set of concurrently performable actions comprises selecting the set of concurrently performable actions based on the entry within the PE RAM.

8. A system comprising:
   a plurality of nodes, each node comprising:
      a plurality of processors;
      local random-access memory (RAM) for the plurality of processors; and,
      at least one memory controller to manage transactions relative to the local RAM, each memory controller having a multiple-stage pipeline for managing the transactions, the pipeline including a decode stage in which the transactions are each decoded into an internal protocol evaluation (PE) command, an integration stage in which an entry within a PE random access memory (RAM) is selected based on the internal PE command, and an evaluation stage in which the entry within the PE RAM is converted to a set of concurrently performable actions, the pipeline to convert the transactions to sets of concurrently performable actions,
   wherein the plurality of nodes form a non-uniform memory access (NUMA) architecture in which each node is able to remotely access the local RAM of other of the plurality of nodes.

9. The system of claim 8, wherein the local RAM of each node is divided into a first memory bank and a second memory bank, and the at least one memory controller comprises a first memory controller for managing transactions relative to the first memory bank, and a second memory controller for managing transactions relative to the second memory bank.

10. The system of claim 8, wherein each memory controller comprises a plurality of look-up tables (LUTs) to decode the transactions into internal protocol evaluation (PE) commands, within the decode stage.

11. The system of claim 10, wherein the plurality of LUTs comprises a coherent request decode RAM for transactions that are coherent requests, a non-coherent request decode RAM for transactions that are non-coherent requests, and a response decode RAM for transactions that are responses.

12. The system of claim 10, wherein each memory controller comprises a PE index RAM and a PE RAM, the PE commands converted into a base address within the PE RAM and an associated qualifier of the base address, within the integration stage, utilizing the PE index RAM.

13. The system of claim 12, wherein each memory controller selects the sets of concurrently performable actions as stored within the PE RAM based on the base address within the PE RAM and the associated qualifier of the base address, within the evaluation stage.

14. The system of claim 8, wherein each memory controller comprises an application-specific integrated circuit (ASIC).

15. An article of manufacture comprising:
   a computer-readable medium; and,
   means in the medium for converting a transaction into a set of concurrently performable actions utilizing a multiple-stage pipeline including a decode stage in which the transaction is decoded into a protocol evaluation (PE) command, an integration stage in which an entry within a PE random access memory (RAM) is selected based on the internal PE command, and an evaluation stage in which the entry within the PE RAM is converted to the set of concurrently performable actions, the transaction being one of a coherent memory request, a non-coherent memory request, and a response to a memory request.

16. The article of claim 15, wherein the means decodes the transaction into an internal protocol evaluation (PE) command in the decode stage.

17. The article of claim 16, wherein the means selects an entry within a PE random access memory (RAM) based on the internal PE command in the integration stage.

18. The article of claim 17, wherein the means converts the entry within the PE RAM to the set of concurrently performable actions in the evaluation stage.

19. The article of claim 15, wherein the medium is one of a recordable data storage medium and a modulated carrier signal.

* * * * *